(12) United States Patent
Yeung

(10) Patent No.: US 8,977,553 B2
(45) Date of Patent: Mar. 10, 2015

(54) DYNAMIC ADJUSTMENT OF TEXT INPUT SYSTEM COMPONENTS

(75) Inventor: Bryan Russell Yeung, Waterloo (CA)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/562,228

(22) Filed: Jul. 30, 2012

(65) Prior Publication Data

US 2014/0032218 A1    Jan. 30, 2014

(51) Int. Cl.
*G06F 17/27* (2006.01)
(52) U.S. Cl.
USPC .......................................................... 704/270
(58) Field of Classification Search
CPC . G06F 17/273; G06F 17/2735; G06F 17/276; G06F 17/0237
USPC .......................................................... 704/270
See application file for complete search history.

(56) References Cited

U.S. PATENT DOCUMENTS

| | | | |
|---|---|---|---|
| 2009/0174667 A1* | 7/2009 | Kocienda et al. | 345/169 |
| 2010/0149103 A1 | 6/2010 | Betts-Lacroix | |
| 2010/0259561 A1* | 10/2010 | Forutanpour et al. | 345/660 |
| 2011/0316800 A1 | 12/2011 | Chacho | |
| 2012/0131497 A1* | 5/2012 | Jitkoff | 715/786 |
| 2012/0167009 A1 | 6/2012 | Davidson et al. | |
| 2012/0169613 A1 | 7/2012 | Armstrong et al. | |

FOREIGN PATENT DOCUMENTS

EP    1480421 A1    11/2004

OTHER PUBLICATIONS

PCT/US2013/051840 International Search Report and Written Opinion, Mailed Mar. 27, 2014.

* cited by examiner

*Primary Examiner* — Michael N Opsasnick
(74) *Attorney, Agent, or Firm* — Troutman Sanders LLP; James E. Schutz; Jay R. Anderson

(57) ABSTRACT

Dynamic adjustment of text input system components is provided. An indication of user activity with respect to a text input system of an electronic device is received. One or more activity indicators are determined based on at least the user activity. One or more components of the text input system are identified, each component providing a typing assistance functionality to a user and being associated with a set of parameters. For each of the one or more components, a determination is made whether the component should be adjusted based on the one or more activity indicators, and the component is dynamically adjusted when it is determined that the component should be adjusted based on the one or more activity indicators. Dynamically adjusting the component includes at least one of activating the component, deactivating the component or adjusting the set of parameters associated with the component.

17 Claims, 4 Drawing Sheets

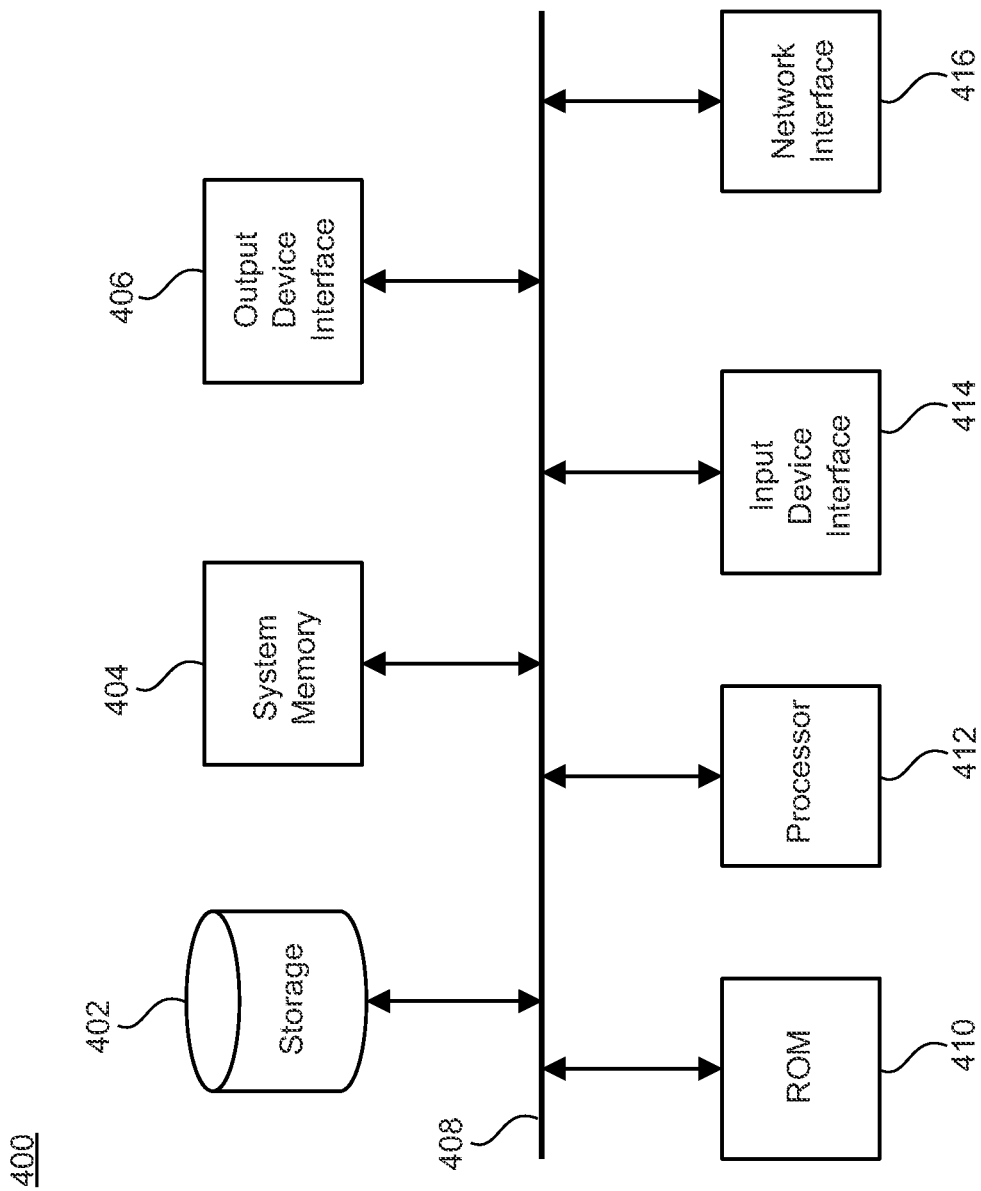

DYNAMIC ADJUSTMENT OF TEXT INPUT SYSTEM COMPONENTS

FIELD

The subject technology generally relates to text input systems, and in particular, relates to dynamic adjustment of text input system components.

BACKGROUND

A variety of text input systems on electronic devices (e.g., touchscreen devices) include one or more components which assist with typing. Each of these components which provide typing assistance functionality generally have a set of parameters that control its operation.

SUMMARY

The disclosed subject matter relates to a machine-implemented method for dynamic adjustment of text input system components. The method comprises receiving an indication of user activity with respect to a text input system of an electronic device, and determining one or more activity indicators based on at least the user activity. The method further comprises identifying one or more components of the text input system, each component providing a typing assistance functionality to a user and being associated with a set of parameters. The method further comprises, for each of the one or more components, determining whether the component should be adjusted based on the one or more activity indicators, and dynamically adjusting the component when it is determined that the component should be adjusted based on the one or more activity indicators. Dynamically adjusting the component comprises at least one of activating the component, deactivating the component or adjusting the set of parameters associated with the component.

The disclosed subject matter further relates to a device for dynamic adjustment of text input system components. The device comprises one or more processors, a text input system, and a machine-readable medium comprising instructions stored therein, which when executed by the processors, cause the processors to perform operations comprising receiving an indication of user activity with respect to the text input system. The operations further comprise determining one or more activity indicators based on at least the user activity, the one or more activity indicators corresponding to typing habits of a user, and identifying one or more components of the text input system, each component providing a typing assistance functionality to the user and being associated with a set of parameters. The operations further comprise, for each of the one or more components, determining whether the component should be adjusted based on the one or more activity indicators, and dynamically adjusting the component when it is determined that the component should be adjusted based on the one or more activity indicators. Dynamically adjusting the component comprises at least one of activating the component, deactivating the component or adjusting the set of parameters associated with the component.

The disclosed subject matter also relates to a machine-readable medium comprising instructions stored therein, which when executed by a system, cause the system to perform operations comprising receiving an indication of user activity with respect to a text input system, determining one or more activity indicators based on at least the user activity, the one or more activity indicators corresponding to typing habits of a user, and identifying one or more components of the text input system, each component providing a typing assistance functionality to the user and being associated with a set of parameters. The operations further comprise, for each of the one or more components, determining whether the component should be adjusted based on the one or more activity indicators, and dynamically adjusting the component when it is determined that the component should be adjusted based on the one or more activity indicators. Dynamically adjusting the component comprises at least one of activating the component, deactivating the component or adjusting the set of parameters associated with the component.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 4 conceptually illustrates an electronic system with which some implementations of the subject technology are implemented.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, a variety of text input systems on electronic devices (e.g., touchscreen devices) include one or more components which assist with typing. Each of these components will generally have a set of parameters that control its operation. However, the most suitable components and parameters to use may depend on the typing habits of the user.

The subject disclosure provides for dynamic adjustment of text input system components. An indication of user activity with respect to a text input system of an electronic device (e.g., a touchscreen device) is received. One or more activity indicators (e.g., corresponding to typing habits of a user) are determined based on at least the user activity. One or more components of the text input system are identified, each component providing a typing assistance functionality to a user and being associated with a set of parameters. For each of the one or more components, a determination is made whether the component should be adjusted based on the one or more activity indicators, and the component is dynamically adjusted when it is determined that the component should be adjusted based on the one or more activity indicators. Dynamically adjusting the component includes at least one of activating the component, deactivating the component or adjusting the set of parameters associated with the component.

Thus, the subject disclosure provides for dynamically enabling or disabling typing assistant components and/or dynamically adjusting the parameters of the components based on user behavior.

Figure 1:
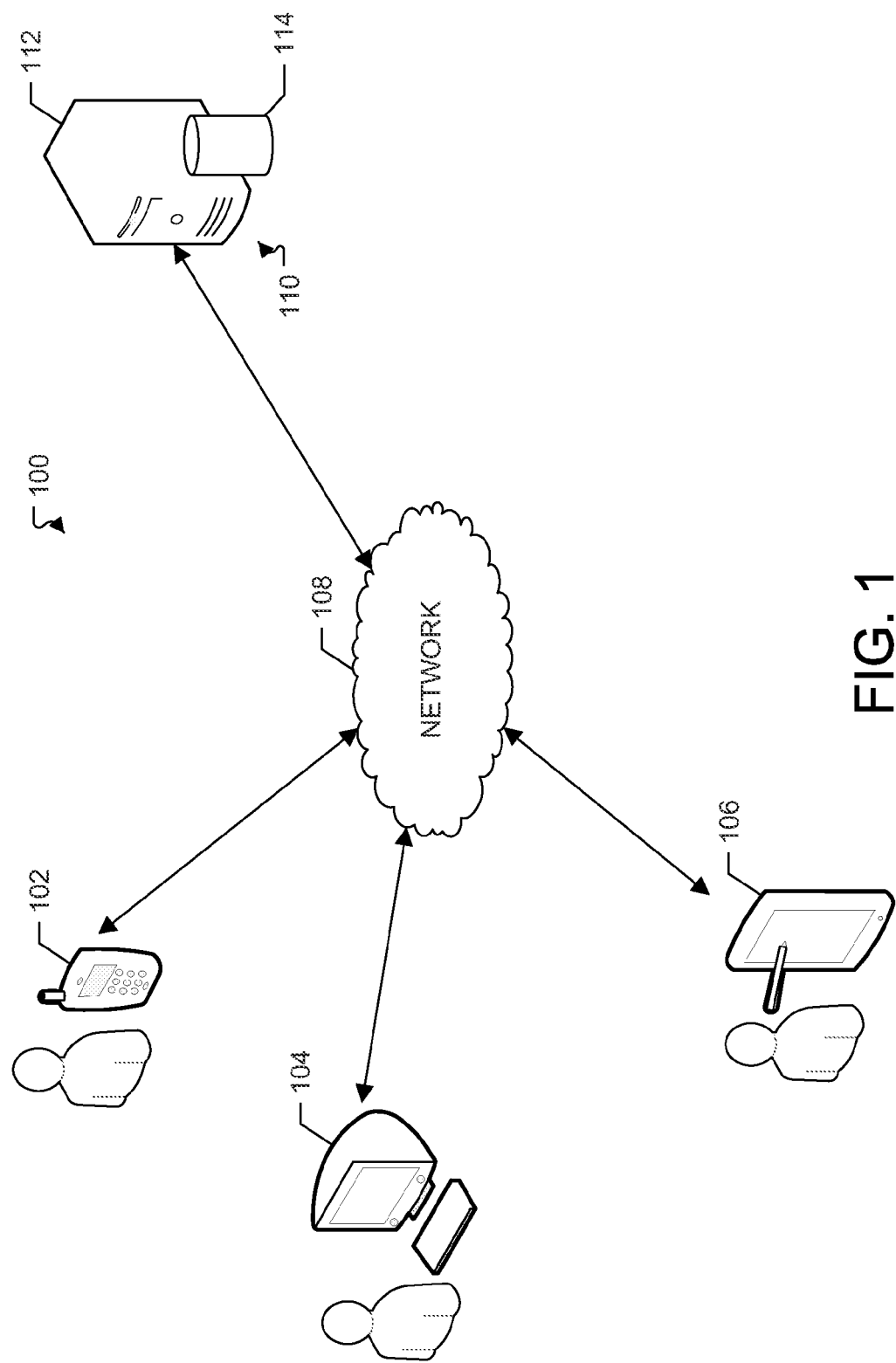
FIG. 1 illustrates an example distributed network environment which can provide for dynamic adjustment of text input system components.

FIG. 1 illustrates an example distributed network environment which can provide for dynamic adjustment of text input system components. A network environment 100 includes a number of electronic devices 102-106 communicably connected to a server 110 by a network 108. In example aspects, each of electronic devices 102-106 can include a touchscreen, which can be built into the device itself or can be electronically connected to the device (e.g., as a peripheral device). Server 110 includes a processing device 112 and a data store 114. Processing device 112 executes computer instructions stored in data store 114, for example, to provide content (e.g., a website or other display content) to any of electronic devices 102-106.

Electronic devices 102-106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

In some example aspects, any of the electronic devices 102-106 may obtain application data (e.g., web page data), and content corresponding to the application data can be displayed on a display (e.g., a touchscreen) of the electronic device (e.g., 102-106). The content corresponding to the application data can include an image (e.g., a map, a graph, a picture, etc.). The content can also include text (e.g., a document, an article, etc.) or a web link. Of course, other types of content can also be obtained. In some example aspects, the content can be transmitted from server 110 via the network 108 to the electronic devices 102-106. In other example aspects, the content can be stored in a storage component (e.g., hard disk, RAM, ROM, etc.) of the respective electronic devices 102-106.

In some example aspects, each of the electronic devices 102-106 may be any machine with appropriate hardware/software to provide for dynamic adjustment of text input system components. An indication of user activity is received with respect to a text input system of the electronic device (e.g., 102-106). The electronic device (e.g., 102-106) determines one or more activity indicators based on at least the user activity. The electronic device identifies one or more components of the text input system, each component providing a typing assistance functionality to a user and being associated with a set of parameters. In addition, for each of the one or more components, the electronic device (e.g., 102-106) determines whether the component should be adjusted based on the one or more activity indicators, and dynamically adjusts the component when it is determined that the component should be adjusted based on the one or more activity indicators. Dynamically adjusting the component includes at least one of activating the component, deactivating the component or adjusting the set of parameters associated with the component.

In other example aspects, a remote server (e.g., server 110) provides for dynamic adjustment of text input system components. An indication of user activity is received at an electronic device. The remote server (e.g., server 110) determines one or more activity indicators based on at least the user activity. One or more components of the text input system are identified, each component providing a typing assistance functionality to a user and being associated with a set of parameters. In addition, for each of the one or more components, the remote server (e.g., server 110) determines whether the component should be adjusted based on the one or more activity indicators, and provides for dynamically adjusting the component when it is determined that the component should be adjusted based on the one or more activity indicators. Dynamically adjusting the component includes at least one of activating the component, deactivating the component or adjusting the set of parameters associated with the component. Furthermore, the details of the adjustment can include a data payload (e.g., a new prediction model or a new dictionary).

Server 110 may be any system or device having a processor, a memory, and communications capability for providing content to the electronic devices. In some example aspects, server 110 can be a single computing device such as a computer server. In other embodiments, server 110 can represent more than one computing device working together to perform the actions of a server computer (e.g., cloud computing).

Network 108 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
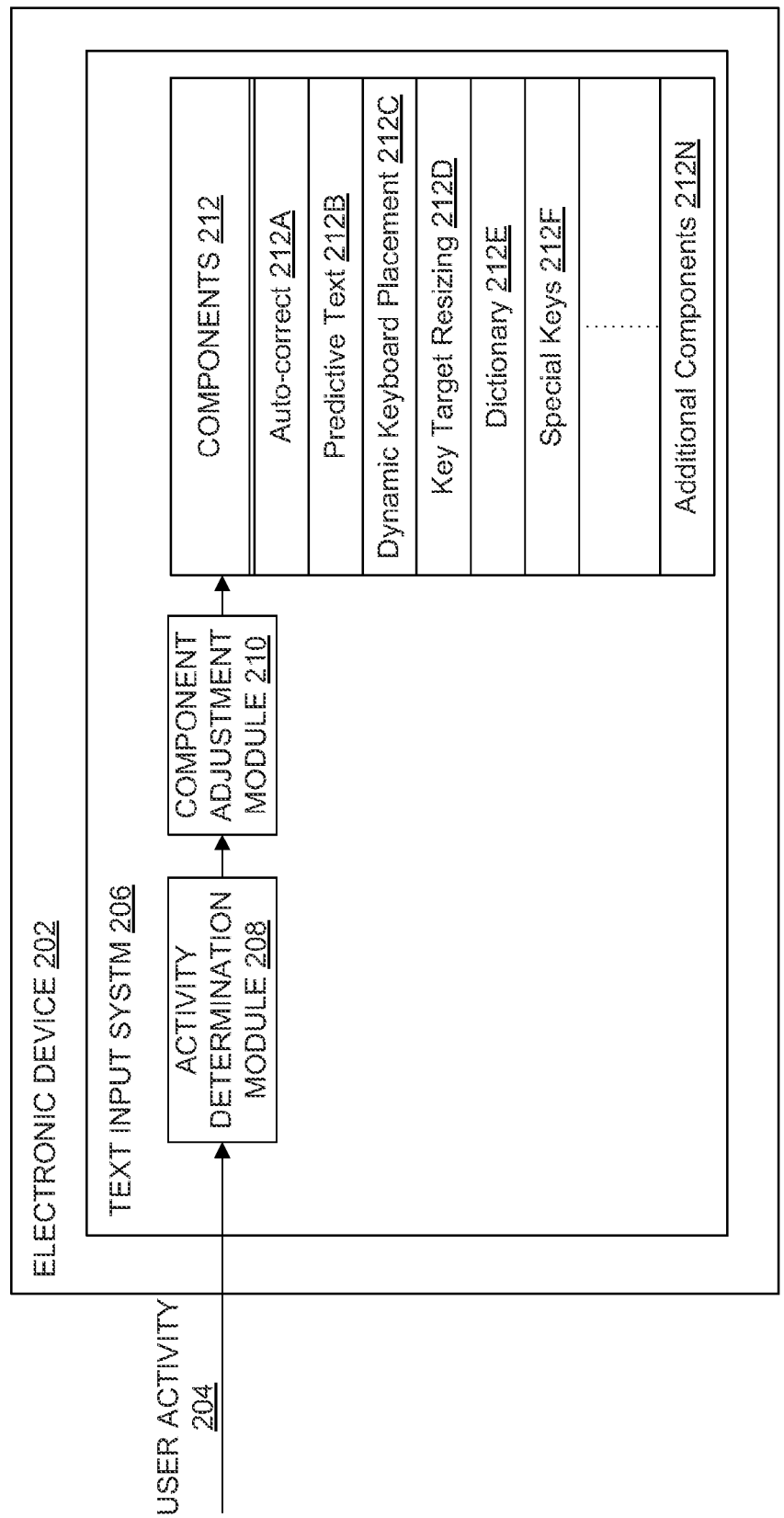
FIG. 2 is a block diagram illustrating an example of an electronic device for dynamic adjustment of text input system components.

FIG. 2 is a block diagram illustrating an example of an electronic device for dynamic adjustment of text input system components. Electronic device 202 can correspond to any of electronic devices 102-106 of FIG. 1. Electronic device 202 includes a text input system 206. Text input system 206 includes an activity determination module 208, a component adjustment module 210 and one or more components 212 (e.g., components 212A-212N).

The term "text input system" as used herein includes its plain and ordinary meaning, including but not limited to a system for electronic input of text. For example, text input system 206 can be displayed as a keyboard on a touchscreen of electronic device 202, and can provide alphanumeric characters for display on electronic device 202. In addition, a text input system can correspond to a peripheral device (e.g., a keyboard) which is integrated within or external to electronic device 202. Text input system 206 receives user activity 204 as input. For example, user activity 204 can correspond to a series of keystrokes entered at respective times. User activity 204 can correspond to real-time user input. Alternatively, user activity 204 can be accessed from log data which stores annotations for the keystrokes at their respective times.

Activity determination module 208 determines one or more activity indicators based on the user activity 204 received via text input system 206. In this regard, various activity indicators (or metrics) can be determined by activity determination module 208, and these indicators can be helpful in adjusting typing assistance functionality for a user. One example of an activity indicator is typing speed, which is measured, for example, based on time decaying average characters per second. For example, when the user is entering characters at a high rate, errors become more likely. In this scenario, it can be beneficial to favor auto-correct text over predictive text. Conversely, if the user is entering characters at a slow rate, it is possible that the user is struggling to spell a word. In this instance, it can be beneficial to favor predictive text over auto-correct text.

Other examples of activity indicators (or metrics) that can be determined by activity determination module include, but are not limited to, manual corrections per unit time (e.g., minute), correction rejections per unit time (e.g., minute), variance of exact touch position within each key, a drift of exact touch position within each key, language classifications of past words, suggestions used per unit time (e.g., how many auto-complete suggestions are used per minute), a number of backspace presses per unit time (e.g., backspaces per minute), and a number of mode changes per unit time (e.g., frequency of user switching to number of special symbol mode). Similar to typing speed, each of these activity indicators (or metrics) can indicate a specific user tendency or behavior useful for adjusting typing assistance functionality for a user.

Regarding typing assistance functionality, text input system 206 includes one or more components 212 which provide typing assistance to a user. Each of the components 212 can be associated with a set of parameters.

In the example of FIG. 2, components 212 include an auto-correct component 212A, a predictive text component 212B, a dynamic keyboard placement component 212C, a key target resizing component 212D, a dictionary component 212E, and a special keys component 212F. Of course, other components can also be included (e.g., additional components 212N).

Auto-correct component 212A can be associated with a set of parameters including a probability threshold of auto-correction. Predictive text component 212B can be associated with a set of parameters including a parameter to control how many predictions are displayed. Dynamic keyboard placement component 212C can be associated with a set of parameters including an x-y offset for a displayed keyboard.

Key target resizing component 212D can be associated with a set of parameters including an amount of inactive space around each key and a size of an active area for each key. Dictionary component 212E can provide a dictionary in association with text input system 206. Dictionary component 212E can be associated with a set of parameters including a parameter for a language of the dictionary and a priority for each of multiple language dictionaries. Special keys component 212F can be associated with a set of parameters including a parameter for a set of special keys that are visible by default.

Additional components 212N correspond to other types of components which provide typing assistance functionality, and a set of parameters can be associated with additional components 212N. For example, the set of parameters can be for controlling the presence of tactile or auditory feedback.

Based on the one or more activity indicators determined by activity determination module 208, component adjustment module 210 can adjust appropriate components for the user. More specifically, for each component 202 (e.g., for each of components 212A-212N), adjustment module 210 determines whether the component should be adjusted based on the one or more activity indicators. Component adjustment module 210 dynamically adjusts the component when it is determined that the component should be adjusted based on the one or more activity indicators. Dynamically adjusting the component includes activating the component, deactivating the component and/or adjusting the set of parameters associated with the component.

Thus, electronic device 202 provides for dynamically enabling/disabling typing assistant components and/or dynamically adjusting the parameters of the components based on user behavior.

Figure 3:
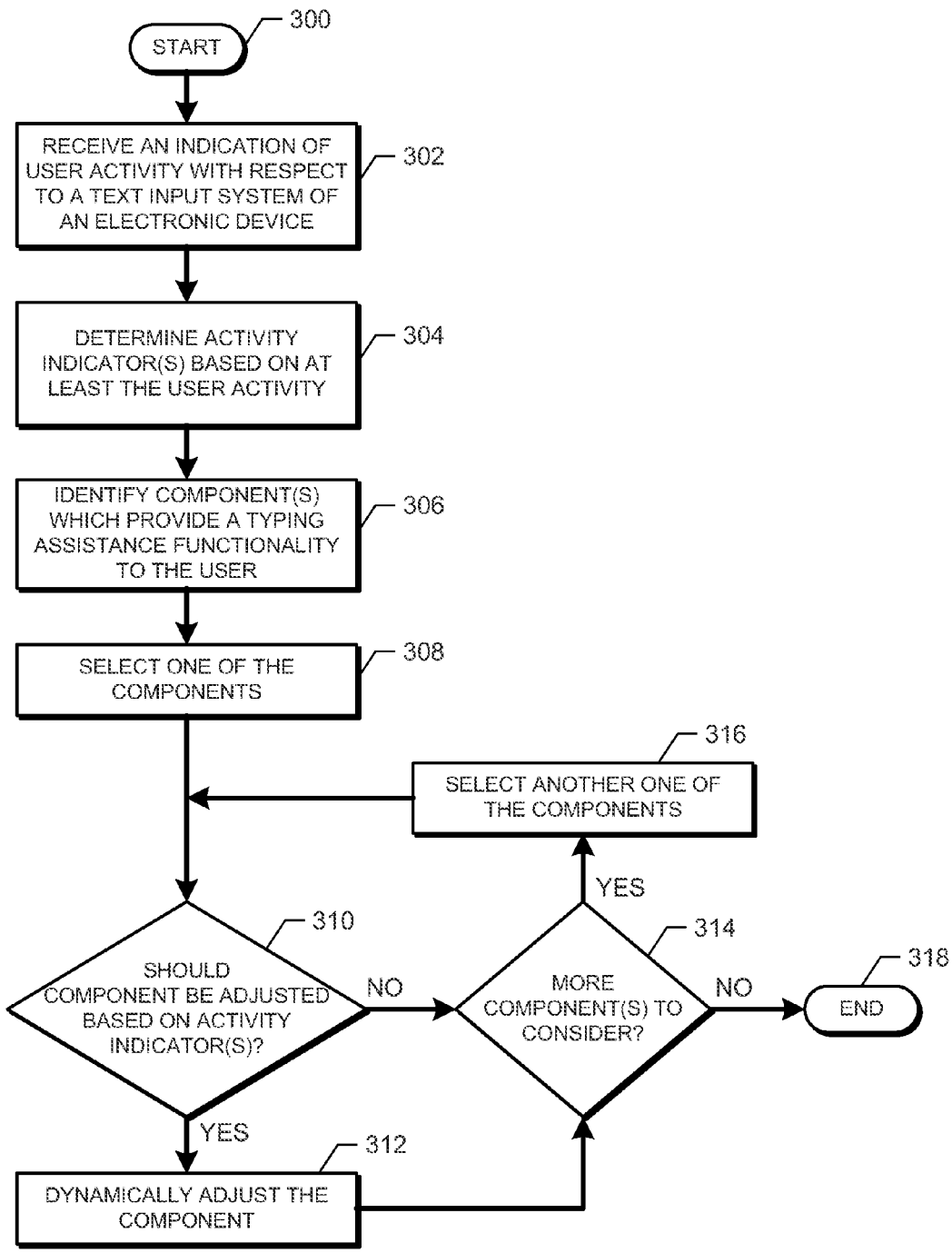
FIG. 3 illustrates an example process by which text input system components are dynamically adjusted.

FIG. 3 illustrates an example process by which text input system components are dynamically adjusted. Following start block 300, an indication of user activity is received with respect to a text input system of an electronic device at step 302. The electronic device can be a touchscreen device.

At step 304, one or more activity indicators are determined based on at least the user activity. The one or more activity indicators can correspond to typing habits of the user. For example, the one or more activity indicators can include a measurement for at least one of a typing speed, manual corrections per unit time, correction rejections per unit time, variance of exact touch position within one or more keys, drift of exact touch position for the one or more keys, a language classification of past words, suggestions used per unit time, backspace presses per unit time, or mode changes per unit time.

At step 306, one or more components of the text input system are identified, each component providing a typing assistance functionality to a user and being associated with a set of parameters. At steps 308-316, for each of the one or more identified components, a determination is made whether the component should be adjusted based on the one or more activity indicators, and the component is dynamically adjusted when it is determined that the component should be adjusted based on the one or more activity indicators.

For example, at step 308, one of the one or more identified components of the system is selected. At decision step 310, an inquiry is made as to whether the selected component should be adjusted based the one or more activity indicators. If the answer to the inquiry is yes, the component is dynamically adjusted at step 312. Dynamically adjusting the component comprises at least one of activating the component, deactivating the component or adjusting the set of parameters associated with the component.

The one or more components can include an auto-correct component, where the set of parameters associated with the auto-correct component includes a probability threshold of auto-correction. The one or more components can include a predictive text component, where the set of parameters associated with the predictive text component includes a parameter to control how many predictions are displayed.

The one or more components can include a dynamic keyboard placement component, where the set of parameters associated with the dynamic keyboard placement component includes an x-y offset for a displayed keyboard. The one or more components can include a key target resizing component, where the set of parameters associated with the key target resizing component includes an amount of inactive space around each key and a size of an active area for each key.

The one or more components can include a dictionary component for providing a dictionary in association with the text input system, where the set of parameters associated with the dictionary component includes at least one of a parameter for a language of the dictionary or a priority for each of multiple language dictionaries. The one or more components can include a special keys component, where the set of parameters associated with the special keys component includes a parameter for a set of special keys that are visible by default.

At decision step 314, a decision is made whether there are more components to consider, and if so, another one of the components is selected at step 316. Steps 310-316 can continue until all of the components identified in step 306 have been considered. The process then ends at end block 318.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

FIG. 4 conceptually illustrates an electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for dynamic adjustment of text input system components in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
receiving an indication of user activity with respect to a text input system of an electronic device;
determining one or more activity indicators corresponding to user typing habits based on at least the user activity, including typing speed;
identifying one or more components of the text input system, each component providing a typing assistance functionality to a user and being associated with a set of parameters, the one or more components including an auto-correct component and a predictive text component; and
for each of the one or more components:
determining, by a processor, whether the component should be adjusted based on the one or more activity indicators; and
dynamically adjusting the component responsive to determining that the component should be adjusted based on the one or more activity indicators;
wherein dynamically adjusting the auto-correct component and the predictive text component comprises adjusting a ratio of display of predictive text to auto-correct text.

2. The method of claim 1, wherein the one or more activity indicators further include at least one of manual corrections per unit time, correction rejections per unit time, suggestions used per unit time, and backspace presses per unit time.

3. The method of claim 1, wherein the one or more components comprise a dynamic keyboard placement component, and wherein the set of parameters associated with the dynamic keyboard placement component comprises an x-y offset fix a displayed keyboard.

4. The method of claim 1, wherein the one or more components comprise a key target resizing component, and wherein the set of parameters associated with the key target resizing component comprises an amount of inactive space around each key and a size of an active area for each key.

5. The method of claim 1, wherein the one or more components comprise a dictionary component for providing a dictionary in association with the text input system, and wherein the set of parameters associated with the dictionary component comprises at least one of a parameter for a language of the dictionary or a priority for each of multiple language dictionaries.

6. The method of claim 1, wherein the one or more components comprise a special keys component, and wherein the set of parameters associated with the special keys component comprises a parameter for a set of special keys that are visible by default.

7. The method of claim 1, wherein the electronic device is a touchscreen device.

8. A device for dynamic adjustment of text input system components, the device comprising:
one or more processors; and
a text input system;
a machine-readable medium comprising instructions stored therein, which when executed by the processors, cause the device to perform operations comprising:
receiving an indication of user activity with respect to the text input system;
determining one or more activity indicators based on at least the user activity, the one or more activity indicators corresponding to typing habits of a user, including at least one of variance of exact touch position within one or more keys and drift of a recorded touch position for the one or more keys;
identifying one or more components of the text input system, each component providing a typing assistance functionality to the user and being associated with a set of parameters, the one or more components including a key target resizing component associated with a set of parameters comprising an amount of inactive space around each key and a size of an active area for each key; and
for each of the one or more components:
determining, by the one or more processors, whether the component should be adjusted based on the one or more activity indicators; and
dynamically adjusting the component when it is determined that the component should be adjusted based on the one or more activity indicators, wherein dynamically adjusting the component comprises adjusting the set of parameters associated with the component.

9. The system of claim 8, wherein the one or more activity indicators comprise a measurement for at least one of a typing speed, manual corrections per unit time, correction rejections per unit time, a language classification of past words, suggestions used per unit time, backspace presses per unit time, and mode changes per unit time.

10. The system of claim 8, wherein the one or more components comprise an autocorrect component, and wherein the set of parameters associated with the auto-correct component comprises a probability threshold of auto-correction.

11. The system of claim 8, wherein the one or more components comprise a predictive text component, and wherein the set of parameters associated with the predictive text component comprises a parameter to control how many predictions are displayed.

12. The system of claim 8, wherein the one or more components comprise a dynamic keyboard placement component, and wherein the set of parameters associated with the dynamic keyboard placement component comprises an x-y offset for a displayed keyboard.

13. The system of claim 8, wherein the one or more components comprise a dictionary component for providing a dictionary in association with the text input system, and wherein the set of parameters associated with the dictionary component comprises at least one of a parameter for a language of the dictionary or a priority for each of multiple language dictionaries.

14. The system of claim 8 wherein the one or more components comprise a special keys component, and wherein the set of parameters associated with the special keys component comprises a parameter for a set of special keys that are visible by default.

15. The system of claim 8, further comprising a touchscreen configured to interact with the text input system.

16. A non-transitory machine-readable medium comprising instructions stored therein, which when executed by at least one processor, cause the at least one processor to perform operations comprising:
receiving an indication of user activity with respect to a text input system;
determining one or more activity indicators based on at least the user activity, the one or more activity indicators corresponding to typing habits of a user;
identifying one or more components of the text input system, each component providing a typing assistance functionality to the user and being associated with a set of parameters, including a special keys component associated with a parameter for a set of special keys that are visible by default; and for each of the one or more components:
- determining, by the a least one processor, whether the component should be adjusted based on the one or more activity indicators; and
- dynamically adjusting the component when it is determined that the component should be adjusted based on the one or more activity indicators, wherein dynamically adjusting the component comprises adjusting the set of parameters associated with the component.

17. The method of claim 1, wherein the typing speed is indicated by a measurement of decaying average characters per second.

* * * * *